INVENTORS
Carl R. Glasener
Alfred R. Willard
Carl R. Weller
BY Hudson, Boughton,
Williams, David & Hoffmann
Attorneys Oct. 28, 1952 — C. R. GLASENER ET AL — 2,616,015
MACHINE FOR WELDING BATTERY PLATES
Filed Aug. 10, 1950 — 4 Sheets-Sheet 3

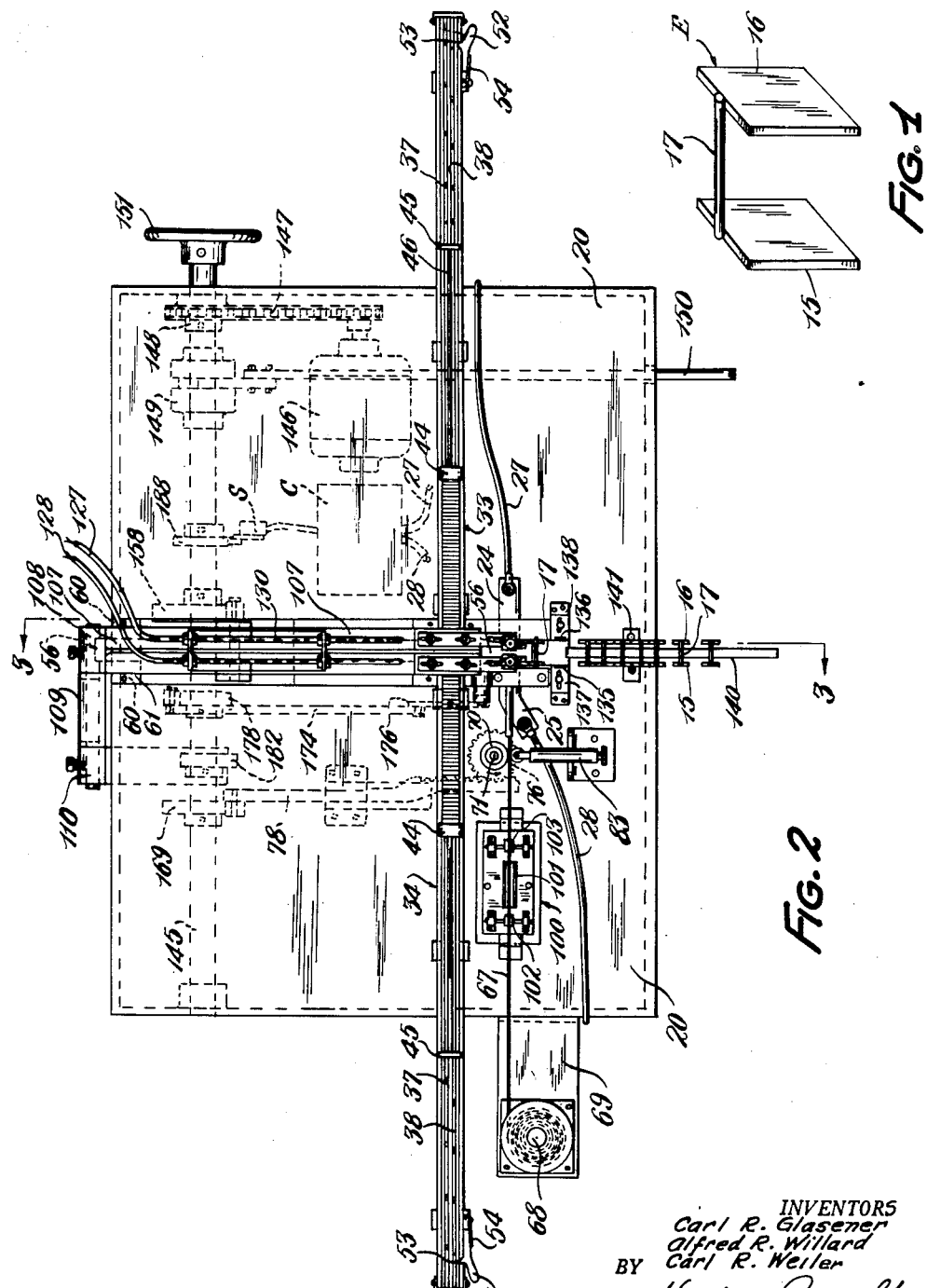

INVENTORS
Carl R. Glasener
Alfred R. Willard
BY Carl R. Weiler
Hudson, Boughton,
Williams, David & Hoffmann
Attorneys Oct. 28, 1952  C. R. GLASENER ET AL  2,616,015
MACHINE FOR WELDING BATTERY PLATES
Filed Aug. 10, 1950  4 Sheets-Sheet 4

INVENTORS
Carl R. Glasener,
Alfred R. Willard
BY Carl R. Weiler

Hudson, Doughton,
Williams, David & Hoffmann
attorneys

Patented Oct. 28, 1952

2,616,015

UNITED STATES PATENT OFFICE 2,616,015

MACHINE FOR WELDING BATTERY PLATES

Carl R. Glasener, Cleveland, Alfred R. Willard, East Cleveland, and Carl R. Weiler, Cleveland, Ohio, assignors to Willard Storage Battery Company, Cleveland, Ohio, a corporation of West Virginia Application August 10, 1950, Serial No. 178,634

7 Claims. (Cl. 219—4)

1

The present invention relates to welding apparatus and particularly to apparatus for automatically welding connector wires to battery plates and the like.

The principal object of the invention is the provision of a new and improved welding apparatus comprising a magazine adapted to successively introduce parts to be welded into a guideway having a welding electrode associated therewith, a reciprocating member in the guideway adapted to move the parts from the magazine into contact with the electrode, a mechanism operable to move a connecting member to be welded to the parts into welding position relative to the parts contacting the electrode, a welding electrode movable into welding contact with the member, and mechanism for automatically actuating the reciprocating member, the connector member feeding mechanism and the movable welding electrode in synchronism to provide repeated automatic welding operations.

Another object of the invention is the provision of a new and improved apparatus of the character described having two magazines for introducing a pair of plates into a guideway having a welding electrode associated therewith, which plates are moved in predetermined spaced relationship into contact with the welding electrode by a reciprocating member, a wire feeding mechanism for disposing a segment of spooled wire to interconnect the spaced plates and severing the segment from the spool, a pair of electrodes adapted to be moved into engagement with the wire engaging the plates, and means for automatically operating the reciprocating member, wire feeding mechanism and movable electrodes in synchronism to repeat successive welding operations.

Further objects and advantages of the invention will be aparent to those skilled in the art to which the invention relates from the following description of the preferred apparatus described with reference to the accompanying drawings forming a part of this specification in which like reference characters designate corresponding parts and in which:

Fig. 1 is a perspective view of a battery element formed by a welding machine embodying a preferred form of the invention;

Fig. 2 is a plan view of the machine for welding connector wires to positive and negative plates to form battery elements like that shown in Fig. 1;

2

Figure 3:
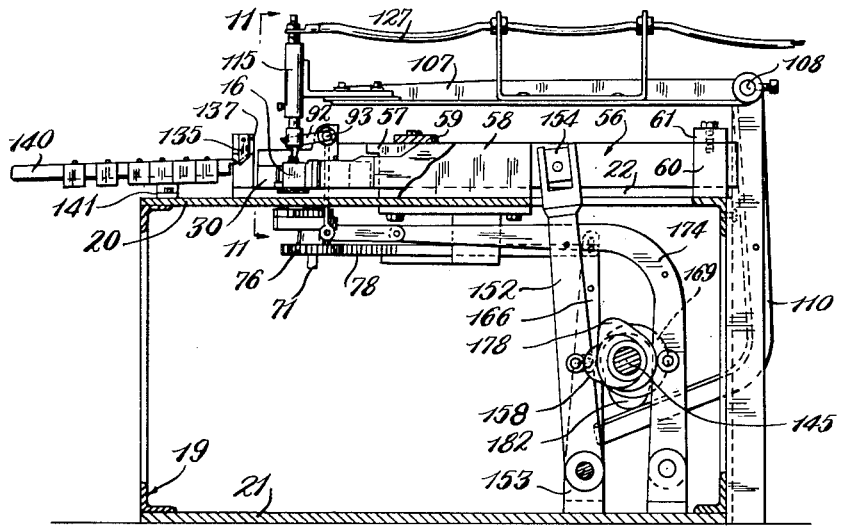
Fig. 3 is a sectional view of the welding machine taken substantially along line 3—3 of Fig. 2.
Figures 4, 6:
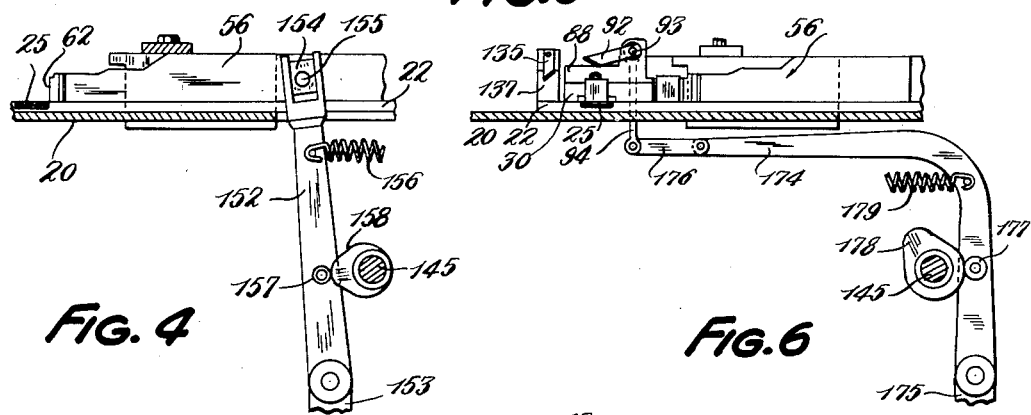
Figures 5, 7:
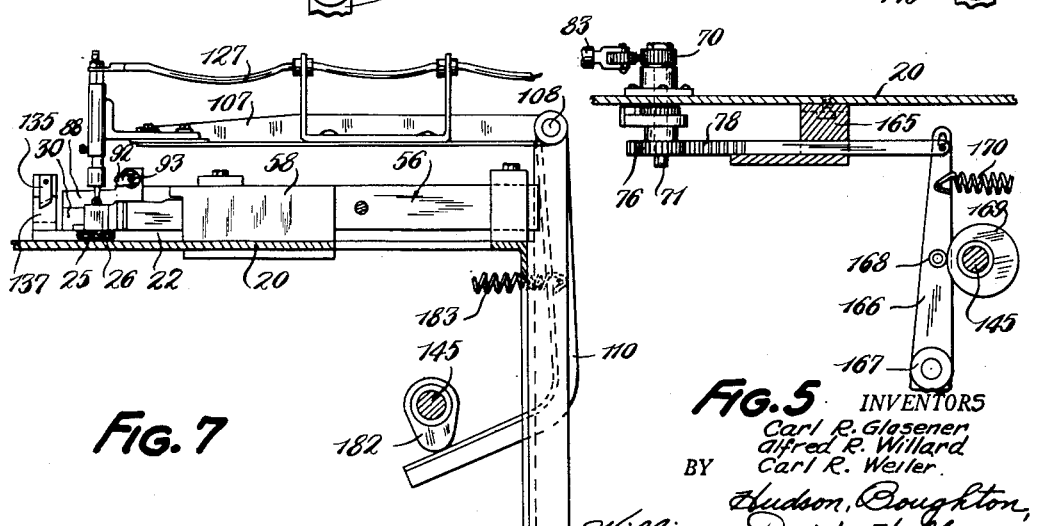
Figure 8:
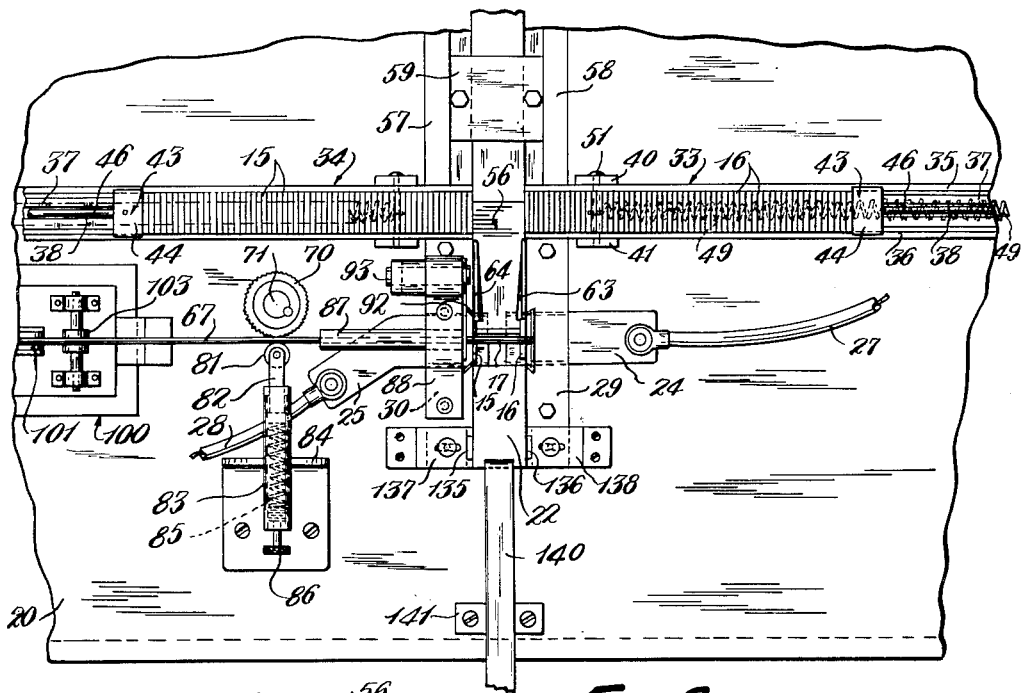
Figure 9:
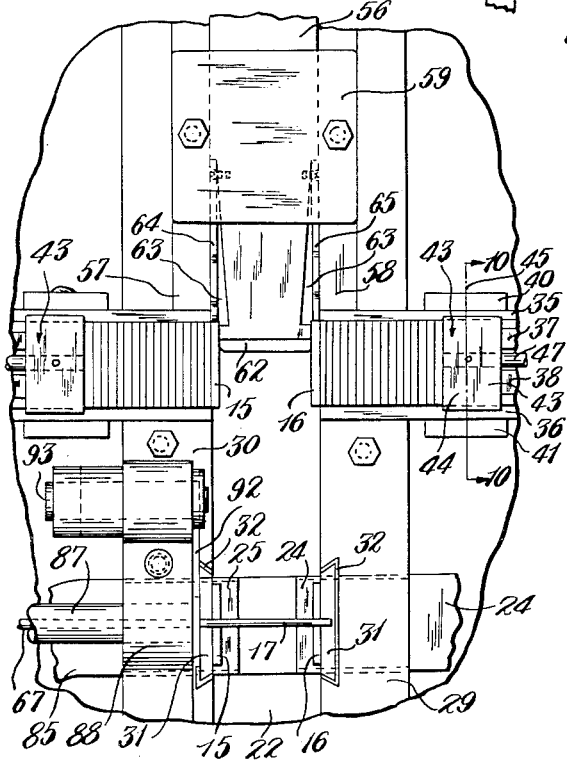
Figure 10:
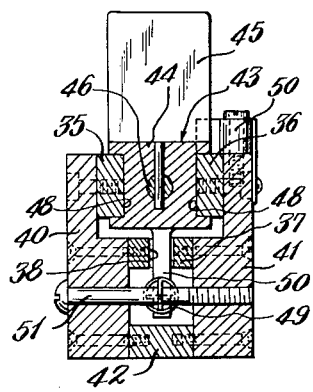
Figure 11:
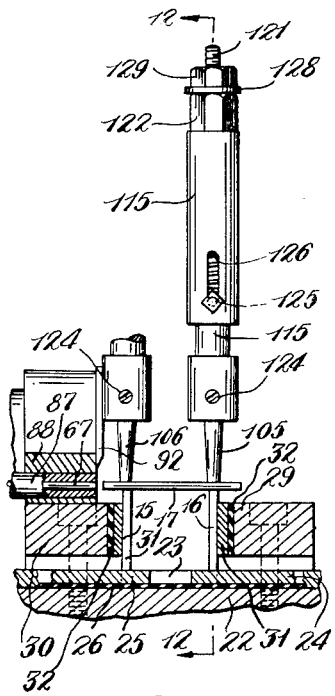
Figure 12:
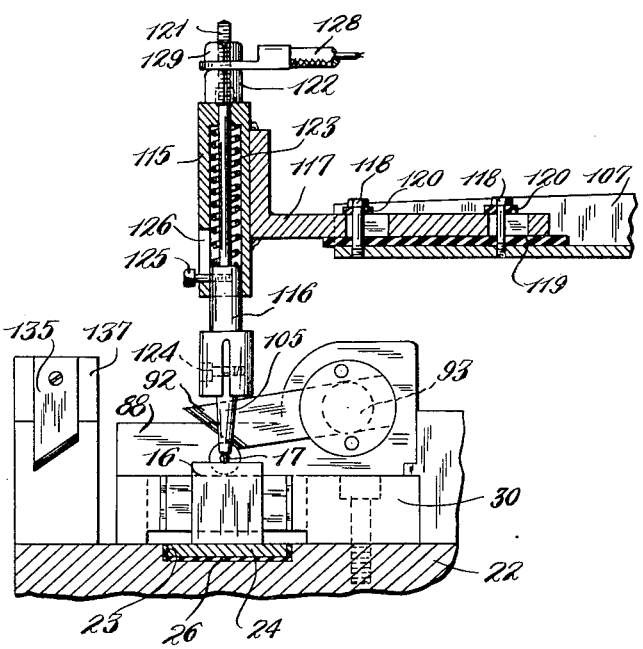
Figure 13:
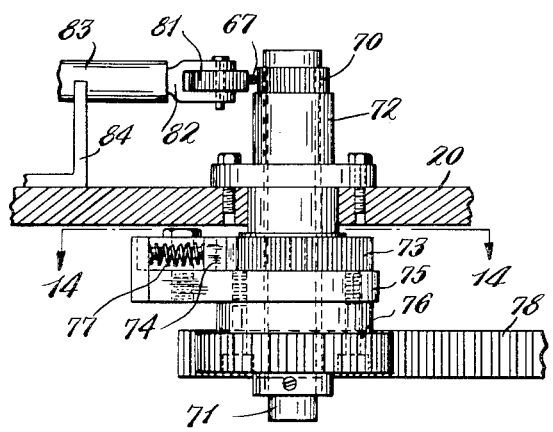
Figure 14:
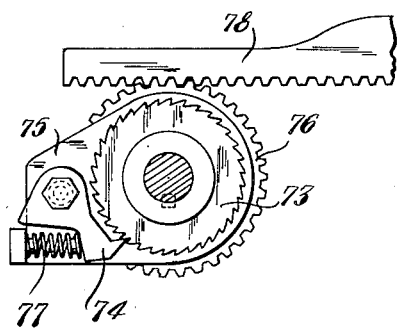

Fig. 4 is a fragmentary view of the welding machine, partly in section, showing mechanism for reciprocating the plate feeding member;

Fig. 5 is a fragmentary view of the welding machine, partly in section, showing the wire feeding mechanism;

Fig. 6 is a fragmentary view of the welding machine, partly in section, showing the wire cutter device;

Fig. 7 is a fragmentary view of the welding machine, partly in section, showing mechanism for moving welding electrodes into and out of welding position;

Fig. 8 is a fragmentary, plan view of the welding machine showing certain parts on an enlarged scale as compared with Fig. 2;

Fig. 9 is a view similar to Fig. 8 but showing certain parts in different positions and on a still larger scale;

Fig. 10 is a sectional view taken along line 10—10 of Fig. 9;

Fig. 11 is a fragmentary view, partly in section, taken substantially along line 11—11 of Fig. 3;

Fig. 12 is a fragmentary sectional view taken along line 12—12 of Fig. 11;

Fig. 13 is a fragmentary view similar to Fig. 5 but showing certain parts of the wire feeding mechanism on a larger scale; and Fig. 14 is a sectional view taken substantially along line 14—14 of Fig. 13.

The invention is particularly suitable for use in a machine adapted to weld connector wires to relatively small positive and negative plates to form battery elements, and it is herein shown as embodied in such a machine comprising a guideway having one electrode of a spot welding apparatus associated therewith, a magazine for introducing plates into the guideway and a reciprocating member adapted to move individual plates from the magazine along the guideway and into contact with the welding electrode. A wire feeding mechanism, including a wire cutter, is operative to position a connector wire between the two plates contacting the electrode, and movable welding electrodes are arranged to engage the connector wire for welding the wire to the plates. Power mechanism is provided for operating the reciprocating member, wire feeding mechanism and movable electrodes and to control the electrode circuit in proper sequence for automatically performing repeated welding operations.

Referring now to the drawings, a welding machine is shown for forming a battery element E, seen in Fig. 1, which element comprises spaced positive and negative plates 15, 16 interconnected by a suitable wire 17 welded to the edges of the plates. The plates of the element shown are approximately ⅝″ square and 1/16″ thick; however, the element shown is merely one example of welding operations which may be performed by the machine.

The machine comprises a frame or table 19 formed of angle iron and plates bolted or welded together for supporting the elements of the machine and it includes top and bottom plates 20, 21. A guideway is provided on the plate 20 for supporting the unwelded battery element plates 15, 16 upright and in the spaced relationship desired in the finished element. The guideway comprises an elongated bottom plate 22 which is suitably attached to the top plate 20, and the forward end of the bottom plate has a transversely extending groove 23 into which two spaced electrode members 24, 25 are positioned, the upper surfaces of which members are flush with the plate surface so that the battery plates may freely slide thereover and make electrical contact therewith. Preferably, the electrode members are wider than the length of the battery plates so that the latter may be entirely supported thereon, as seen in Fig. 12. The electrode members 24, 25 are spaced apart and insulated from the plate 22 by suitable dielectric material 26 and are connected in separate electric welding circuits by cables 27, 28 attached thereto by suitable terminals.

The sides of the guideway comprise guide bars 29, 30, bolted to the plate 22 and which present vertical, parallel surfaces spaced apart to correspond to the desired width of the battery element. The guide bars each has a vertical undercut groove having a beveled plate 31 therein insulated from the groove walls by insulation 32, and the undersides thereof are cut away to bridge the respective electrodes 24, 25.

The battery plates 15, 16 are introduced to the guideway at the rear of the guide bars 27, 28 by two elongated magazines 33, 34 on opposite sides of the guideway and which extend normal thereto. The magazines 33, 34 each comprises two elongated, oppositely disposed side bars 35, 36 and an intermediate bottom bar 37, all of which are bolted to three pairs of L-shaped, complementary arranged frame members 40, 41, spaced longitudinally of the magazine, to provide a trough into which the battery plates may be fitted edgewise and slid along the magazine. The bar 37 has a slot-like opening 38 therethrough which extends from the outer end to slightly beyond the middle thereof, the purpose of which appears hereinafter. A spacer bar 42, coextensive with bars 35, 36, 37, is attached intermediate the members 40, 41 at the lower portions thereof and is suitably attached to the frame plate 20 to secure the magazine in place.

The battery plates are moved along the magazines by pusher devices 43, each of which comprises spaced plates 44, 45 interconnected by a rod 46 connected at its ends to the respective plates. The plates 44, 45 are notched at the sides, as seen at 48, to receive the side bars 35, 36 which form guides along which the plates move. The pusher devices are each normally urged inwardly by an elongated tension spring 49 one end of which is attached to a depending finger 50 on plate 45, which finger projects downwardly through the slot 38 in bar 37, and the other end of which spring is attached to a bolt 51 supported in openings through the innermost pair of frame members 40, 41. The slot in bar 37 extends from the outer end inwardly slightly more than one-half the length of the bar so that the plate 46 can travel a sufficient distance to move plate 45 to the inner end of the magazine. It will be seen that a considerable number of battery plates can be arranged edgewise, in files, in the magazines between the guide bars 35, 36 and are moved to the inner ends of the magazines by the pusher plates 44 which engage the outer ends of the files of plates. In practice, the negative plates are loaded in one magazine and the positive plates in the other magazine. Preferably, for convenience in loading the magazines, a latch lever 52 is pivotally attached to each of the magazines adjacent the outer ends thereof, which lever has a projection 53 which is adapted to be moved by a spring 54 into the path of the plate 45 when the latter is moved outwardly beyond the projection to hold the pusher in its retracted positions. The plate 45 has an upstanding portion which provides a handle for facilitating movement of the pusher outwardly by the operator.

The battery plates 15, 16 are adapted to be stripped one at a time from the inner ends of the respective magazines 33, 34 by a reciprocating member 56 and moved forwardly between the guide bars 29, 30 in properly spaced relation and positioned on the electrode members 24, 25, respectively. The member 56 is elongated and generally rectangular in cross-section and is adapted to reciprocate in a guide formed by two spaced angle irons 57, 58, which extend upwardly from the bottom side of plate 20 through registered slots through the plates 20 and 22, and which angle irons have the flange portions thereof bolted to the underside of plate 20. The top edges of the angle irons 57, 58 are bridged by a plate 59 bolted thereto to prevent upward movement of the member 56. The rear end of the member 56 is adapted to slide through a rectangular guide formed by two spaced upright plates 60 at the rear end of the bottom plate 22, and a cross plate 61 bolted to the upright plates. The mechanism for reciprocating member 56 is described hereinafter.

The forward end of the member 56 has a nose or head formation 62, the width of which corresponds to the inside spacing of the battery plates 15 and 16 of the finished battery element and the space between the sides of the nose and the adjacent sides of the guideway accommodates a battery plate. The member 56 has two inset portions 63 in opposite sides thereof to the rear of the nose 62, and two forwardly extending leaf springs 64, 65 are attached at their rear ends in the inset portions. The forward portions of the springs are normally urged outwardly by the inherent resiliency of the springs so that the forward edges thereof engage battery plates urged against the sides of the nose, as seen in Fig. 9, and push such plates forwardly. The insets 63 are formed to receive the forward ends of the springs 64, 65 so that as the member 56 is drawn rearwardly, as viewed in Fig. 9, battery plates from the magazines may deflect the springs as the plates move into engagement with opposite sides of the nose 62. The ends of the springs move outwardly, after they pass the battery plates at the inner ends of the magazine, and into alignment with the plates. During forward movement of the member 56 the sides thereof prevent the entrance of battery plates into the guideway from the magazines. By this construction the reciprocation of member 56 removes a single battery plate from the inner ends of each magazine and moves the two plates forwardly into position on the welding electrode members 24, 25.

The wire forming the connector 17 of the battery element is furnished from a spool of suitable wire 67 which is supported at one end of the frame 19 on a spindle 68 attached to a bracket 69 secured to the frame 19. The wire 67 is automatically positioned on the top edges of the battery plates supported on the electrode members 24, 25 by a wire feeding mechanism comprising a knurled wheel 70 attached to the upper end of a shaft 71 which is rotatably supported in a bearing 72 bolted to the plate 20 and over an opening through the plate. The shaft 71 is adapted to be intermittently rotated through a predetermined angle to feed the wire by a ratchet wheel 73 which is keyed to the shaft and which is driven by a pawl 74 carried on a plate 75 which is attached to a rack gear 76 supported on the shaft and adapted to rotate independently of the latter. The gear 76 meshes with a reciprocating rack 78 and is adapted to be oscillated as the rack is reciprocated by mechanism described hereinafter. The pawl 74 is urged into engagement with the teeth of the ratchet wheel 73 by a spring 77 and is arranged to intermittently drive the ratchet wheel counterclockwise, as viewed in Fig. 14, as the gear 76 and plate 75 oscillate. The wire 67 is held in driving engagement with the knurled wheel 70 by a wheel 81 which is supported on a forked plunger 82 adapted to reciprocate in a cylinder 83 attached to a bracket 84 on the plate 20. The plunger 82 is urged outwardly by a coil spring 85 so that the wheel 81 holds the wire firmly to the drive wheel 70. Preferably, the tension of the spring may be adjusted by a screw 86 threaded in the outer end of the cylinder and engaging one end of the spring.

The wire 67 extends through a tube 87, which is supported in a block 88 attached to the top of the guide bar 30, and projects immediately above the upper edges of battery plates 15, 16 resting on the electrode members 24, 25. The knurled wheel 70 is adapted to be rotated intermittently through an angle such that sufficient wire is fed through the tube 87 during each rotational movement to interconnect the plates 15, 16 and to project slightly beyond the outsides of the two plates.

The wire 67 projecting over the battery plates in the guideway is adapted to be severed at the outlet end of tube 87 by a blade 92, one end of which is attached to a shaft 93 journalled in the block 88. The blade 92 is adapted to be oscillated by the shaft 93 to cut the wire and is normally in a raised position, as seen in Fig. 6, and is adapted to be lowered to shear the wire by the reciprocation of an arm 94 attached to the shaft 93, which arm is moved by mechanism described hereinafter.

Preferably, to insure proper welding, the wire 67 is coated with a suitable fluxing material prior to passing between the feed wheels 76, 81 and for this purpose it is passed through a flux box 100 which is supported on the top plate 20 and which comprises a closed receptacle containing a suitable flux, the top of which receptacle has a grooved wheel 101 rotatably supported in a slot therethrough and about which the wire 67 passes for immersion into the flux. The wire passes over guide wheels 102, 103 at opposite sides of the wheel 101.

The wire segment 17 severed from the spool wire 67 and which engages the top edges of the two battery plates 15, 16 on the electrode members 24, 25, is adapted to be spot welded to the top edges of the battery plates by two welding electrodes 105, 106, which coact with the electrodes 24, 25, respectively, to effect the welding. The electrodes 105, 106 are carried on the forward end of an arm 107 which is pivotally supported at its rear end on a rotatable shaft 108 journalled in a bracket 109 attached to the rear of the frame 19 and oscillated by mechanism described hereinafter. The electrodes are resiliently supported on the arm 107 by identical devices each comprising a sleeve 115 having a plunger 116 reciprocable therein. Each sleeve 115 is welded to a bracket 117 which is attached to the arm 107 by bolts 118. The brackets 117 are each insulated from the arm 107 by an insulator 119 and insulating washers 120 between the bolts and bracket. The upper end of the sleeve 115 is reduced in diameter and the plunger 116 has a stem 121 which projects therethrough and is threaded to receive a nut 122. A coil spring 123 surrounds stem 121 and is interposed between the upper end of the sleeve and the portion of the plunger 116 at the base of the stem for normally urging the plunger downwardly relative to the sleeve so that the electrode attached to the plunger is held to the wire to be welded under predetermined pressure as determined by the spring. The electrodes proper extend into split sockets in the lower ends of the respective plungers and are clamped therein by a bolt 124 extending through an opening in one side of the split socket and threaded in the other side to clamp the split socket segments to the electrodes. A bolt 125 is threaded into an opening in one side of the plunger 116 and extends through a slot 126, in the side of the sleeve and engages the ends of the slot to limit movement of the plunger in the sleeve. The electrodes 105, 106 are connected in their respective welding circuits by cables 127, 128 which are respectively connected to the stems 121 between nuts 122 and 129.

It will be seen in Fig. 11 that the connector wire segment 17 severed by the cutter 92 projects somewhat beyond the sides of the battery element, and since these overhanging portions of the wire are undesirable, provision is made for trimming these portions as the welded element moves forwardly from the electrode members 24, 25. This trimming is effected by fixed knives 135, 136 which are disposed at opposite sides of the guideway and are supported on similarly formed brackets 137, 138 attached to the frame top 20 at opposite sides of the guideway plate 22. The knives 135, 136 have sharp inclined edges located in the planes of the outer sides of the battery plates and in line with the overhanging portions of the connector wire. The welded battery plates are forced forwardly by the succeeding forwardly propelled unwelded plates, and as they pass the knives 135, 136, the extending end portions of the connector wires are sheared.

Preferably, a bar 140 is attached to the top plates 20 by a bracket 141 and is arranged in alignment with the forward end of the guideway so that as the welded battery elements are pushed forwardly beyond the knives 135, 136 they move onto the bar 140 and are supported thereon by the connector wires 17 thereof. When a quantity of finished battery elements have collected on the bar 140, they may be easily removed by an operator or they may drop from the end of the bar into a receptacle.

The reciprocating member 56, the wire feeding mechanism and the electrode carrying arm 107 are adapted to be actuated in synchronism by a mechanism which comprises a shaft 145 journalled at opposite ends on the frame 19 beneath the top plate 20. The shaft 145 is adapted to be driven by an electric motor 146 through a chain 147 which drives a sprocket 148 supported on the shaft 145 and which sprocket is drivingly connected and disconnected from the shaft by a conventional clutch 149 which is controlled by a lever 150 projecting from the front of the frame 20. Preferably, a hand wheel 151 is attached to one end of the shaft 145 which extends from one side of the frame to provide for manual positioning of the shaft.

Referring particularly to Fig. 4, the member 56 is reciprocated by an arm 152, the lower end of which is pivotally supported on a bracket 153 attached to the bottom wall 21 of the frame and the upper end of which arm is forked to slidingly receive a block 154 which is pivotally connected to the member 56 by a pin 155. The arm 152 is normally urged rearwardly by a tension spring 156 anchored to the frame 19, and a roller 157 on the arm rides on the periphery of a cam 158 attached to the shaft 145 so that the arm is oscillated by the cam and spring as the shaft rotates. The cam 158 is so shaped that during one revolution of shaft 145, the member 56 moves forward to push a pair of battery plates from the magazines 33, 34 onto the electrode members 24, 25 and dwells or rests momentarily while the connector wire 17 is fed in place and the electrodes 105, 106 are pressed to the connector wire to hold the plates in position, after which dwell and prior to the welding operation, the member 56 is retracted toward its initial position.

As may be best seen in Fig. 5, the oscillating rack 78 of the wire feeding mechanism is slidingly supported by a bracket 165 attached to the underside of plate 20 so that the rack slides in the plane of the gear 76. The rear end of the rack 78 is attached to the upper end of an arm 166 which is pivoted at its lower end to a bracket 167 attached to the plate 21 of the frame 19. A slotted connection is provided between the arm 166 and rack 78 to compensate for relatively vertical movements between the ends of the arm and the rack during oscillation of the arm. The arm 166 has a roller 168 which is adapted to engage a cam 169 attached to the shaft 145, and the arm is biased to engage the roller with the cam by a tension spring 170, one end of which is attached to the frame and the other to the arm. The shape of the cam 169 is such that the stroke of the rack 78 rotates shaft 71 through an angle which moves the spool wire 67 forwardly through feed tube 87 a distance corresponding to the segment to be welded to the battery plates and which stroke occurs either during or after the movement of two battery plates 15, 16 to the electrode members 24, 25 by the member 56 and before the electrodes 105, 106 have been lowered.

Referring now to Fig. 6, the arm 94 of the wire cutting blade 92 is actuated to lower the blade 92 and shear the connector wire by an L-shaped arm 174 which has its lowered end pivoted to a bracket 175 on the bottom plate of the frame 19 and the outer end of which is connected to arm 94 by a link 176 to permit relative movements between the ends of the arms. The arm 174 has a roller 177 attached thereto which is adapted to ride on the periphery of a cam 178 attached to the shaft 145. A tension spring 179 having one end connected to a part of frame 19 and the other to arm 174 urges the lever counterclockwise and maintains the roller in engagement with the cam. The cam 178 is so formed that arm 174 is moved clockwise to operate blade 92 to shear the wire immediately after the electrodes 105, 106 have engaged the wire to press it to the battery plates.

As may be clearly seen in Fig. 7, the electrode carrying arm 107 is raised and lowered by the arm 110 which is L-shaped and the lower end of which engages a cam 182 attached to the shaft 145. The arm 110 is held to the cam 182 by a tension spring 183 one end of which is connected to the arm and the other end to the frame 19, and the cam is so shaped that the arm is moved counterclockwise to lower the electrodes 105, 106 to the connector wire before the connector wire has been severed from the spooled wire and is adapted to maintain the electrodes in this position until after the wire is welded to the plates, after which the arm 107 is raised.

The welding circuit employed for the coacting sets of electrodes 24, 105 and 25, 106 respectively, may be of any well known design and preferably, welding current is momentarily applied through the pairs of electrodes 105, 24 and 106, 25 successively rather than simultaneously by a suitable control mechanism inclosed in a housing C, the details of which mechanism are not shown, but which are well known in the art. Suffice to say, the control for the welding circuits includes a switch S which is operated by a cam 188 on the shaft 145 to initiate the welding operations at the proper time, i. e., when the electrodes 105, 106 are in engagement with the severed segment of the wire 17 on the top edges of the battery plates.

It is to be understood that the cams 158, 169, 178, 182, 188, do not necessarily have the contours shown in the drawings nor are their relative positions on the shaft 145 necessarily correct as shown; such contours and positions may be accurately designed by those skilled in the art.

It is believed that the operation of the welding machine will be clearly understood from the foregoing description and that it is apparent that the operator need only fill the magazines 33, 34 as required, and to maintain a supply of spooled wire and flux in the machine. A completed battery element is produced during each revolution of the shaft 145.

It will be seen that the objects enumerated have been attained as well as others and that we have provided an automatic welding machine which quickly and efficiently welds relatively small parts with a minimum of the attention from the operator, and it is to be understood that the invention is not limited to the particular construction shown and described and it is our intention to cover hereby all adaptations, modifications and uses thereof which come within the practice of those skilled in the art to which the invention relates and within the scope of the appended claims.

Having thus described our invention, we claim:

1. In a welding machine for welding connectors to battery plates, means forming a guideway adapted to receive plates to be welded therein, an electrode of a welding circuit associated with the guideway and adapted to be contacted by a plate in the guideway, a reciprocating member in said guideway adapted to move plates along said guideway and position said plates in contact with said electrode, mechanism adapted to feed a connector into position to be welded to a plate in contact with said electrode, a welding electrode adapted to be moved into engagement with the connector on the plate, and means for moving said reciprocating member, connector feeding mechanism and movable electrode in synchronism.

2. In a welding machine for welding connector wires to battery plates, means forming a guideway adapted to receive plates to be welded therein, a magazine extending laterally of the guideway and adapted to contain a plurality of battery plates and to automatically urge plates into said guideway, an electrode of a welding circuit associated with the guideway and adapted to be contacted by a plate in the guideway, a reciprocating member in said guideway adapted to reciprocate laterally of the discharge of said magazine and move plates along said guideway and position said plates in contact with said electrode, mechanism adapted to feed wire into position to be welded to a plate in contact with said electrode, a welding electrode adapted to be moved into engagement with the wire on the plate, and means for moving said reciprocating member, wire feeding mechanism and movable electrode in synchronism.

3. In a welding machine for welding connectors to battery plates, means forming a guideway adapted to receive plates to be welded therein, a pair of electrodes of separate welding circuits associated with the guideway at opposite sides thereof and adapted to be contacted by plates in the guideway, a reciprocating member in said guideway adapted to move a pair of plates along opposite sides of said guideway and position said plates in contact with said electrodes, mechanism adapted to feed a connector between the plates on the electrodes and into position to be welded to the plates, a pair of welding electrodes in the respective welding circuits adapted to be moved into engagement with the connector between the plates, and means for moving said reciprocating member, connector feeding mechanism and movable electrodes in synchronism.

4. In a welding machine for welding connectors to battery plates, means forming a guideway adapted to receive plates to be welded therein, two magazines extending laterally from opposite sides of said guideway and adapted to discharge battery plates into opposite sides of said guideway, two electrodes of separate welding circuits associated with opposite sides of the guideway and adapted to be contacted by the plates in the guideway, a member in said guideway adapted to reciprocate laterally of the discharge ends of said magazines, said member having opposite sides of one portion spaced from the adjacent sides of the guideway to receive a battery plate on opposite sides of said portion and said member including parts at one end of said portion to engage edges of plates at the sides of said portions to move said plates along the guideway, said member adapted to move said plates along said guideway and position said plates in contact with said electrodes, mechanism adapted to feed a connector between said plates and positioned to be welded to the plates in contact with said electrodes, two welding electrodes adapted to be moved into engagement with the connector on said plates, and means for moving said reciprocating member, connector feeding mechanism and movable electrodes in synchronism.

5. In a welding machine for welding connectors to battery plates, means forming a guideway adapted to receive plates to be welded therein, an electrode of a welding circuit associated with the guideway and adapted to be contacted by a plate in the guideway, a magazine extending laterally of said guideway and adapted to urge battery plates sidewise into said guideway, a member movable in said guideway and having a side of a portion thereof spaced from the side of the guideway to receive a battery plate from the magazine between said portion and the side of the guideway, said member having a part engageable with an edge of a plate between said portion and guideway side to move the plate as the member moves in one direction, and means for reciprocating said member through a stroke to move said portion of said member from opposite the discharge of said magazine to over said electrode and return.

6. In a welding machine for welding connectors to battery plates, means forming a guideway adapted to receive plates to be welded therein, an electrode means of a welding circuit associated with the guideway and adapted to be contacted by battery plates in opposite sides of the guideway, two oppositely disposed magazines extending laterally from opposite sides of said guideway and adapted to urge battery plates sidewise into said guideway, a member movable in said guideway and having side portions spaced from the sides of said guideway to receive battery plates from said magazines between said portions and the sides of said guideway, said member having parts engageable with edges of said plates between said portions and guideway sides to move the plates as the member moves in one direction, and means for reciprocating said member through a stroke to move said portions from opposite the discharge ends of said magazines to over said electrode.

7. In a welding machine for welding connectors to battery plates, means forming a guideway adapted to receive plates to be felded therein, an electrode of a welding circuit associated with the guideway and adapted to be contacted by a plate in the guideway, a magazine adapted to urge plates into one side of said guideway, a reciprocating member in said guideway adapted to engage plates discharged from said magazine and move said plates along said guideway and position said plates in contact with said electrode, mechanism adapted to feed a connector into position to be welded to a plate in contact with said electrode, a welding electrode adapted to be moved into engagement with the connector on the plate, means for moving said reciprocating member from the discharge of said magazine to position the plate moved thereby on the said electrode and return, said means adapted to cause said member to dwell at said electrode, means for moving the movable electrode into contact with said connector during the dwell of the movement of said member, and means to energize said welding circuit after said member has started its return movement.

CARL R. GLASENER.
ALFRED R. WILLARD.
CARL R. WEILER.

REFERENCES CITED

The following references are of record in the file of this patent:

UNITED STATES PATENTS

| Number | Name | Date |
| --- | --- | --- |
| 1,622,792 | Languepin | Mar. 29, 1927 |
| 2,034,560 | Bumstead | Mar. 17, 1936 |
| 2,477,859 | Burge | Aug. 2, 1949 |